US005530870A

United States Patent [19]
De Bruler

[11] Patent Number: 5,530,870
[45] Date of Patent: Jun. 25, 1996

[54] ARRANGEMENT FOR EFFICIENTLY TRANSFERRING PROGRAM EXECUTION BETWEEN SUBPROGRAMS

[75] Inventor: Dennis L. De Bruler, Downers Grove, Ill.

[73] Assignee: AT&T Corp., Murray Hill, N.J.

[21] Appl. No.: 464,988

[22] Filed: Jun. 5, 1995

Related U.S. Application Data

[62] Division of Ser. No. 577,427, Sep. 4, 1990.

[51] Int. Cl.$^6$ ........................................ G06F 9/42
[52] U.S. Cl. ................... 395/700; 364/261.3; 364/280.4; 364/DIG. 1
[58] Field of Search ..................................... 395/650, 700

[56] References Cited

U.S. PATENT DOCUMENTS

| | | | |
|---|---|---|---|
| 3,348,211 | 10/1967 | Ghiron | 395/401 |
| 3,568,158 | 3/1971 | Haller et al. | 395/775 |
| 3,794,980 | 2/1974 | Cogar et al. | 395/375 |
| 4,152,761 | 5/1979 | Louie | 395/650 |
| 4,297,743 | 10/1981 | Appell et al. | 395/650 |
| 4,530,049 | 7/1985 | Zee | 395/459 |
| 4,755,935 | 7/1988 | Davis et al. | 395/250 |
| 4,777,588 | 10/1988 | Case et al. | 395/800 |
| 4,847,755 | 7/1989 | Morrison et al. | 395/650 |
| 4,887,215 | 12/1989 | Kumagai et al. | 364/431.04 |
| 4,945,480 | 7/1990 | Clark et al. | 395/700 |
| 4,951,194 | 8/1990 | Bradley et al. | 364/200 |

FOREIGN PATENT DOCUMENTS 1216429  8/1989  Japan ............................... G06F 9/42

OTHER PUBLICATIONS

*80960KB Programmer's Reference Manual*, Intel, Inc. (1989) pp. 4–1 to 4–15.

M. J. Bach, *The Design of the UNIX® Operating System*, Prentice–Hall, Inc. (1986), pp. 159 to 171.

*UNIX System User's Manual*, Release 5.0, Bell Laboratories, Inc. (Jun. 1982) p. SETJMP(3C).

"Maxicomputing in Microspace", *UNIX™ Microsystem WE® 32100 Microprocessor Information Manual*, AT&T, (Jan. 1985), pp. 3–28 to 3–32, 4–16 to 4–23, and 5–37 to 5–43.

Y. Chu (ed.), *High–Level Language Computer Architecture*, Academic Press, Inc. (1975) pp. 77 to 81.

C. P. Pfleeger, *Machine Organization*, John Wiley & Sons, Inc. (1982) pp. 123 to 139.

H. Lorin, *Introduction to Computer Architecture and Organization*, John Wiley & Sons, Inc. (1982) pp. 95 to 106.

J. Letz et al., *Living With RISC: Software Issues in the Regulus Architecture*, Proceedings of the 1987 IEEE International Conference on Computer Design: VLSI in Computers & Processors, Oct. 1987, pp. 549–557.

D. P. Ryan, *Intel's 80960: An Architecture Optimized for Embedded Control*, IEEE Micro, No. 3, Jun. 1988, pp. 63–76.

S. McGeady, *Inside Intel's i960CA superscalar processor*, Microprocessors and Microsystems, vol. 14, No. 6, Jul./Aug. 1990, pp. 385–396.

*C. Programming Tools for i960™ Microprocessor Family*, Intel brochure, entire brochure.

S. McGready, *A Programmer's View of the 89060 Architecture*, Thirty–Fourth IEEE Computer Society International Conference Compcon Spring 89 Digest of Papers, Feb. 27–Mar. 3, 1989, pp. 4–9.

Primary Examiner—Alvin E. Oberley
Assistant Examiner—John Q. Chavis
Attorney, Agent, or Firm—David Volejnicek

[57] ABSTRACT

An arrangement called PASS CONTROL (FIG. 11) is used in combination with a conventional RETURN statement as a substitute for a conventional CALL-and-RETURN subprogram invocation sequence (FIG. 2), and effects a return from a whole series of subprogram invocations directly to the subprogram that initiated the series without intervening returns to the subprograms that made the intermediate invocations in the series. The arrangement uses the conventional execution stack (114) to effect the series of invocations and the return therefrom (FIGS. 12–14). The subprograms that are invoked by the series of invocations share an execution stack frame (1620). Both a compiler arrangement and an application program execution arrangement for effecting PASS CONTROL functionality are disclosed.

12 Claims, 10 Drawing Sheets

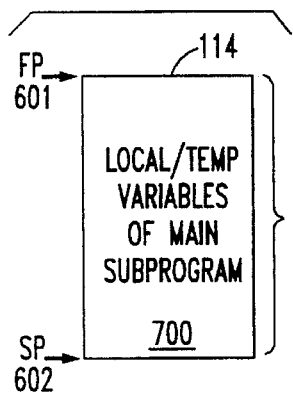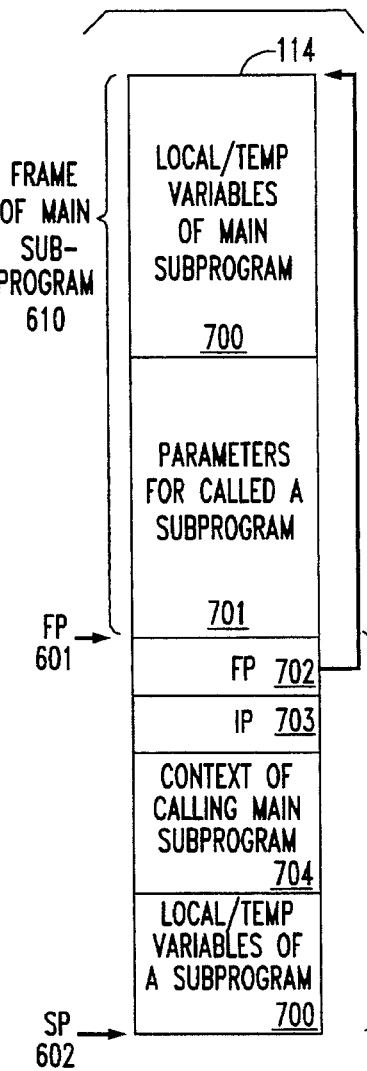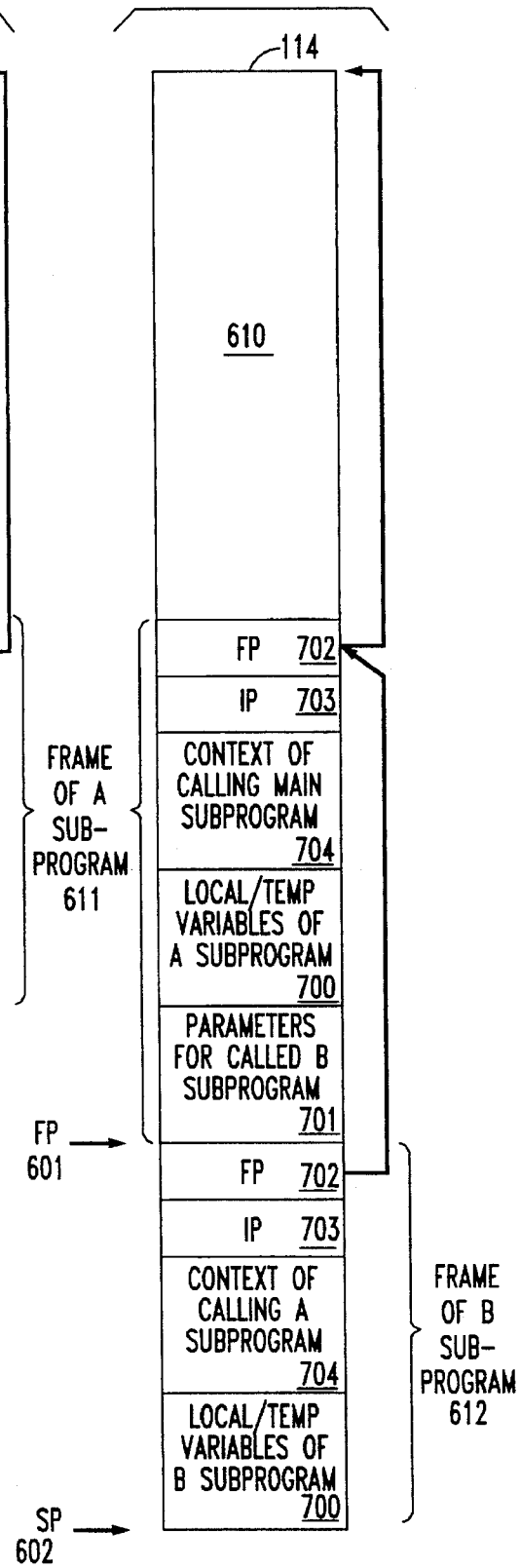

ARRANGEMENT FOR EFFICIENTLY TRANSFERRING PROGRAM EXECUTION BETWEEN SUBPROGRAMS

This is a division of application Ser. No. 07/577,427 filed Sep. 4, 1990.

TECHNICAL FIELD

The invention relates to arrangements for linking the execution of subprograms in computers.

BACKGROUND OF THE INVENTION

A subprogram is a program which invokes the execution of another program and whose execution is eventually returned to from an invoked program, or a program whose execution is invoked by another program and which ends by returning execution to another program, such as the program that invoked it. Of course, a program can be both an invoking and an invoked subprogram. Subprograms are also known by other names, such as routines, subroutines, functions, and procedures. The term "subprogram" as used herein encompasses all such variations.

Subprograms are extensively used in structured, or modular, programming—a commonly-used programming technique that breaks a task up into a sequence of sub-tasks. Structured programming can result in long chains of subprograms, wherein an initial, or main, subprogram invokes subprogram A, which in turn invokes subprogram B, which invokes subprogram C, and so on. Such chains of subprograms are characteristic of certain types of application programs, such as protocol handlers, transaction handlers, database query servers, and call processing systems. These types of application programs are also characterized by throughput constraints. All other things being equal, throughput is directly proportional to the speed of program execution. Consequently, it is important that the invocations of subprograms and the returns from those invocations be executable as quickly as possible.

Of course, one way of speeding up program execution is to use a faster computer. But computer speed is typically directly proportional to computer cost, and hence this approach is costly. Furthermore, technology invariably sets practical limits to the speed of program execution that can be achieved at any time in the continuum of technological development. Consequently, it is important that the invocation of subprograms and the returns from those invocations be implemented as efficiently as possible in order to achieve the fastest possible program execution with a given computer or computer technology.

The traditional and ubiquitous manner of implementing an invocation of a subprogram and a return from that invocation is the CALL and the RETURN statements. These high-level instructions work together with a stack—a last-in, first-out memory structure. Each subprogram that has not completed execution has a frame of information on the stack. Stored in the stack frame is information such as arguments or parameters, local variables, return values, and other information associated with the subprogram. The CALL statement results in the storage of the context of the calling subprogram in a stack frame, and creation of a stack frame for the called subprogram. The context includes information such as general registers contents, instruction pointer contents, and a condition code. The RETURN statement results in deletion of the stack frame of the returning, previously-called, subprogram from the stack, and the restoration of the processor to the stored context of the returned-to, previously-calling, subprogram.

All of this manipulation of memory contents and processor state is time-consuming, and hence detracts from system throughput. Furthermore, in a long chain of subprogram calls, the stack can grow to occupy a significant area of memory, thereby reducing the amount of memory available for other uses. Aside from the obvious memory limitations that this can impose, it can also detract from system throughput by increasing the frequency of occurrence of certain activities, such as swapping of pages to and from main memory.

In view of these disadvantages of the conventional subprogram call-and-return arrangement, attempts have been made to improve upon it, but with limited success.

One known assembler and link editor combination employs a feature known as "leaf proc", Which causes the link editor to change a standard call instruction into a branch-and-link (BAL) instruction. The BAL instruction leaves an address of the following (in terms of compilation, as opposed to execution, order) instruction stored in a predetermined off-stack location, such as a general-purpose register, and then performs a conventional branch operation to the target instruction as specified by the operand of the BAL instruction. The state of the stack remains unchanged thereby. A return is then accomplished with a branch instruction, whose operand is the general-purpose register into which the BAL instruction had stored the return address. However, the BAL instruction is limited in use for calls to subprograms that are written in assembly language, that do not call other subprograms, including themselves, and that do not require more than a few general-purpose registers.

The UNIX® operating system employs two pairs of features known as "setjmp" and "longjmp". One pair is implemented as algorithms of the operating system itself, while the other pair is implemented as library functions in the user interface to the operating system.

At the operating system kernel level, the "setjmp" algorithm performs a context switch, but instead of storing the saved context on the stack, saves it in the new process memory area which contains process control information that need be accessed only in the context of that process (the u area). Execution then continues in the context of the old process. When the kernel wishes to resume the context it had saved, it uses the "longjmp" algorithm, which restores the saved context from the u area. This technique is confined to implementations of operating system kernels that include the notion of processes. It is a system-level function available only to the operating system kernel, and is not accessible for use by application programmers.

At the user interface level, the "setjmp" function performs a context switch and saves the old context on the stack, but stores pointers to that context in a predetermined off-stack location. Thereafter, the "longjmp" function, when given the address of the predetermined off-stack location as a parameter, restores and returns to the stored context. While the "longjmp" function can save much of the overhead of the conventional RETURN statement, the "longjmp" function does nothing to reduce the overhead of the conventional CALL statement, such as CPU instruction cycles and stack memory consumption. Also, any subprogram that contains a longjmp instruction must have an ancestor subprogram (a preceding subprogram in the chain of subprogram invocations) that executed a setjmp instruction. Consequently, a subprogram that uses the "longjmp" function cannot be called "normally", as opposed to a subprogram that can be called without restriction from any context. Furthermore, a setjmp cannot be used within a recursive invocation chain (a sequence of subprogram invocations wherein the last invocation of the sequence invokes the subprogram that made the first invocation in the sequence, thereby forming a loop), though the setjmp can be used by an ancestor subprogram of the recursive chain.

Finally, certain known interpreters make use of a feature known as "tail recursion". Usable only in a self-referential recursive function, and usable only when the last action that the recursive function performs before returning is to call itself, this feature suppresses generation of a stack frame for the called iteration of the function and instead reuses the frame of the calling iteration of the function. While effective in eliminating much of the overhead of a conventional CALL-and-RETURN statement sequence, the "tail recursion" feature is limited only to the self-referential recursive function calls, and therefore has limited applicability and usefulness.

SUMMARY OF THE INVENTION

This invention is directed to solving these and other disadvantages of the prior art. According to the invention, an arrangement, illustratively referred to herein as PASS CONTROL, effects a return from a whole series of invocations of different subprograms directly to the subprogram that initiated the series, without intervening returns to the subprograms that made the intermediate invocations in the series. According to a first aspect of the invention, presented is a method and an arrangement for executing a series of subprogram invocations of a plurality of different subprograms. The series commences with a first invocation, followed by at least one intermediate invocation, and thereafter ends with a last invocation. During execution of the subprograms, in response to each invocation in the series of a subprogram by an invoking subprogram, execution of the invoking subprogram ceases and execution of the invoked subprogram commences. Further in response to the first invocation in the series, a pointer to an instruction at which the execution of the invoking subprogram that made the first invocation is stored on the execution stack. Illustratively, in contrast, an instruction pointer is not storm in response to any other invocation in the series. Then, in response to a return from a subprogram that was invoked by the last invocation in the series, execution of the returned subprogram ceases, the stored instruction pointer is retrieved from the execution stack, and execution of the subprogram that made the first invocation in the series is resumed at the instruction pointed to by the retrieved instruction pointer. This branch of execution from the last-invoked subprogram to the subprogram that initiated the series of invocations is direct or immediate, without a meantime resumption of execution of any subprogram that made an intermediate invocation in the series.

Because a return from the last-invoked subprogram is effected directly to the subprogram that initiated the series of invocations, the time that is conventionally consumed in both performing the individual returns between each calling and called subprogram, and in manipulating the execution stack in order to effect the individual returns, is saved. System throughput and performance are markedly improved in modular implementations as a consequence. Yet the method and arrangement use the conventional execution stack in order to effect the series of invocations and the return therefrom, as opposed to using an exceptional, special, off-stack mechanism, as is done in some prior art arrangements. Consequently, unlike in the prior art, a subprogram can be invoked normally in all circumstances. That is, in a single program, the same one subprogram can be invoked by either or both of the standard CALL arrangement and the PASS CONTROL arrangement, and without the execution system having to keep track of, or adjust its operation in consequence of, the type of invocation used.

Preferably, all of the subprograms that are invoked by the invocations in the series share an execution context, thereby further reducing the time spent on effecting invocations and returns therefrom. In response to the first invocation in the series, the execution context of the invoking subprogram that made the first invocation is stored on the execution stack. In contrast, execution context is not saved in response to any other invocation in the series. Rather, the existing context is retained and shared. Then, in response to the return from the subprogram that was invoked by the last invocation in the series, execution context is restored to the one context that is stored on the stack. Of course, this restoration is done directly, without the conventional intervening restoration of the contexts of subprograms that made intermediate invocations in the series.

Furthermore, preferably the amount of memory consumed by the execution stack during the series of invocations is significantly reduced and limited, by causing all of the subprograms that are invoked by the series of invocations to share a single stack frame, as opposed to creating a new stack frame for each invoked subprogram. In response to the first invocation in the series, a stack frame for the invoked subprogram is created on the execution stack, and the instruction pointer and execution context of the invoking subprogram are stored therein. In contrast, a stack frame is not created in response to any other invocation in the series, nor are an instruction pointer and an execution context stored on the stack frame in response thereto. Information, e.g., local and temporary variables, for each invoked subprogram may be stored in the shared stack frame in one of two ways: either in an area of the stack frame that is shared by all of the invoked subprograms, or in the one of a plurality of such areas that each invoked subprogram has allocated for its own use in an expandable shared frame. Parameters are passed by each invoking subprogram to each invoked subprogram either through general registers, or through a shared parameters area of a stack frame of the subprogram that initiated the series of invocations and that precedes the shared stack frame on the execution stack. Then, in response to the return from the last-invoked subprogram, the execution context and instruction pointer are restored from the current stack frame (the shared stack frame, in this case), and the entire current stack frame is deleted from the execution stack, as is done by any return invocation.

According to a second aspect of the invention, the functionality characterized above is brought about by a novel compiler arrangement for compiling a source program that comprises a plurality of different source subprograms that are made up of source code statements including subprogram invocation statements and subprogram return statements. Specifically, the source program includes a series of statements of invocation of a plurality of different source subprograms. Except for the first invocation statement in the series, the statements in the series are each included in a source subprogram that is invoked by a preceding invocation statement in the series. The series commences with the first invocation statement followed by at least one intermediate invocation statement and thereafter ends with a last invocation statement. The compiler arrangement compiles the source program into an object program that comprises a plurality of object subprograms made up of object instructions. In response to encountering in a source subprogram a statement invoking a source subprogram, the compiler arrangement generates an instruction to branch from execution of an object subprogram compiled from the source subprogram that includes the invoking statement, to execution of an object subprogram compiled from the invoked source subprogram. In response to encountering in a source subprogram a CALL statement which is the first invocation in the series, the compiler arrangement generates instructions to store on the execution stack a pointer to an instruction at which is to resume execution of an object subprogram compiled from the source subprogram that includes the first invocation statement. Illustratively, in contrast, the compiler arrangement does not generate instructions to store an instruction pointer in response to encountering any of the PASS CONTROL statements which are subsequent invocations in the series. Then, in response to encountering a return statement in a source subprogram that is invoked by the last invocation statement in the series, the compiler arrangement generates an instruction to retrieve the stored instruction pointer from the execution stack, and to branch from execution of an object subprogram compiled from the source subprogram that includes the return statement to execution of the object subprogram compiled from the source subprogram that includes the first invocation statement in the series, at the instruction pointed to by the instruction pointer retrieved from the execution stack, and to branch so directly, without in the meantime resuming execution of any object subprogram compiled from a source subprogram that includes an intermediate invocation statement in the series. The compiler arrangement also brings about the additional functionality that has been characterized above, by generating corresponding object instructions.

These and other advantages and features of the present invention will become apparent from the following description of an illustrative embodiment of the invention taken together with the drawing.

BRIEF DESCRIPTION OF THE DRAWING

FIGS. 6–10 are block diagrams of conventional execution stack manipulations effected by the execution of the compiled instructions of FIGS. 3–5 by the computer of FIG. 1;

DETAILED DESCRIPTION

A simple way to come to understand and appreciate the invention is to contrast it with the conventional call-and-return arrangement. Accordingly, this discussion begins with a rather extensive discussion of that arrangement.

Figure 1:
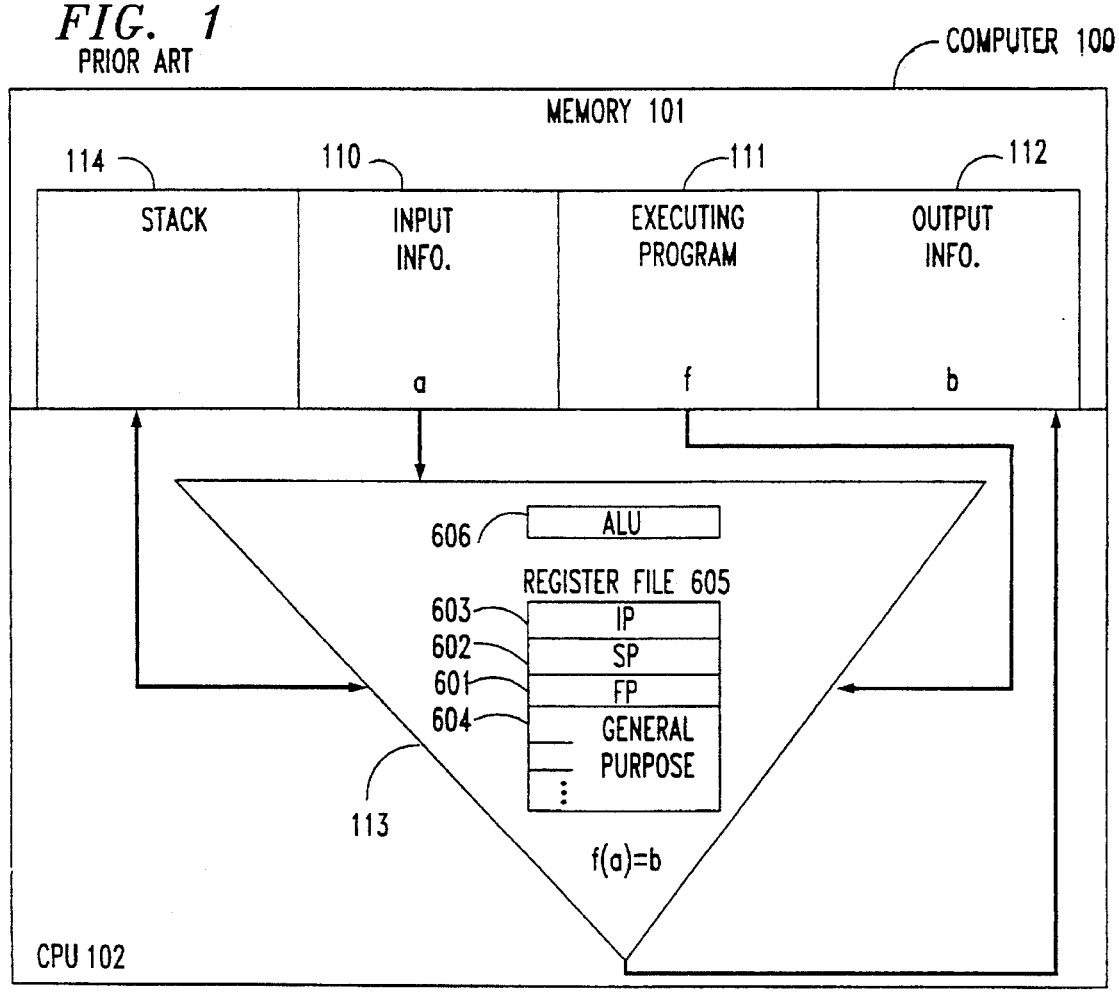
FIG. 1 is a functional block diagram of a computer that serves as the environment of an illustrative embodiment of the invention.

FIG. 1 is a block diagram of an illustrative general purpose data processor operating under stored program control, referred to hereafter as a computer 100. Computer 100 includes memory 101 and a central processing unit (CPU) 102. CPU 102 conventionally includes an arithmetic and logic unit (ALU) 606 and a register file 605 including at least an instruction pointer (IP) register 603, a stack pointer (SP) register 602, a frame printer (FP) register 601, and a plurality of general purpose registers 604. Memory 101 herein represents any form of storage, such as RAM, ROM, and/or disk. It includes a program 111 for execution by CPU 102, and input information 110 for use by program 111 during its execution. Following execution of program 111 by CPU 102, memory 100 also includes output information 112 produced by the execution of program 111 while using input information 110. CPU 102 can therefore be viewed as implementing a functional element 113 defined by the expression $$f(a)=b$$

wherein f is the function implemented by the executing program 111, a is the input information 110, and b is the output information 112.

In order for a program 111 to be executed by computer 100, the program must be in a form that is understood by logic (e.g. ALU 606) of computer 100. This form is commonly referred to as an object program. However, most programs are not initially written in object form, but are written in a high-level, source program form. Consequently, before a program can be executed by computer 100, it must be converted from source to object form. The conversion is performed by a compiler object program, or compiler for short. Initially, therefore, executing program 111 is a compiler, input information 110 is an application source program, and output information 112 is an application object program created by the compiler from the application source program. Thereafter, the application object program becomes executing program 111, and it operates on application input information 110 to produce application output information 112.

During its execution, a program 111 uses an execution stack 114 implemented in memory 101 to temporarily store at least some partial input and output information as well as other temporary or transient information. Briefly turning to FIG. 8, stack 114 is a last-in, first-out memory structure. Associated with it are two pointers: stack pointer (SP) 602 that points to the next free storage location on stack 114, and frame pointer (FP) 601 that points to the beginning, the first storage location, of the stack portion that is associated with the presently-executing subprogram. This stack portion extends between the stack pointer and the frame pointer and is referred to as a frame, e.g., frame 610, 611, 612. A focus of this application is the efficient use of stack 114 by the object program that was created by the compiler, and the way in which the compiler brings about that efficient use by the object program.

Figure 2:
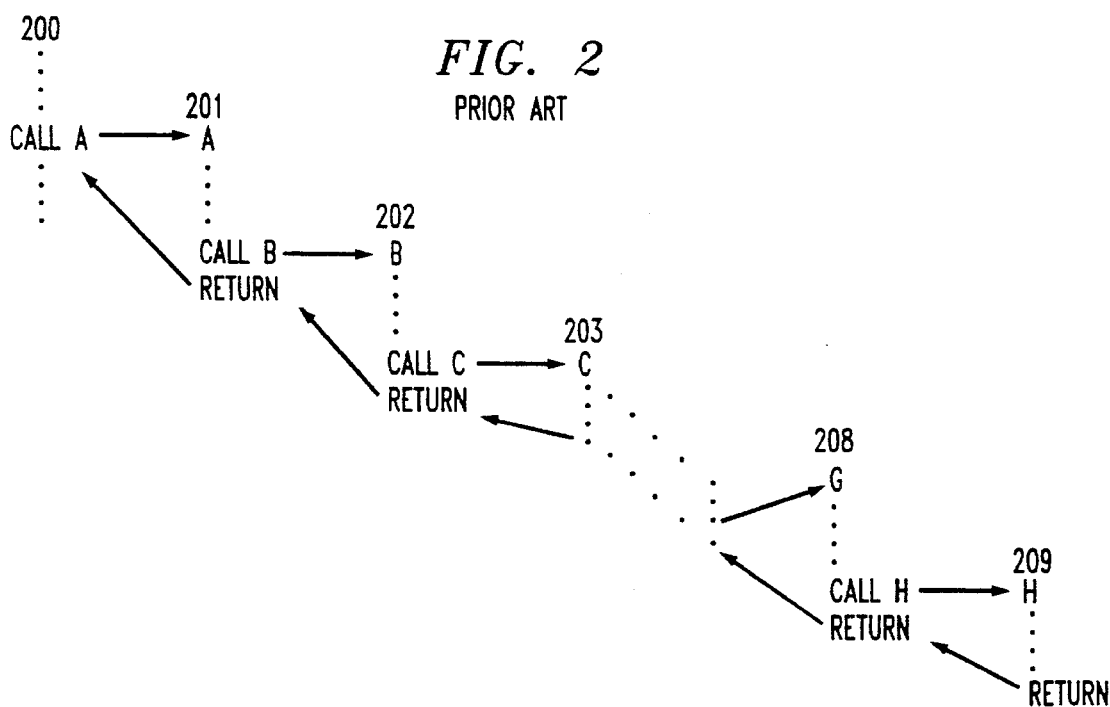
FIG. 2 is a functional diagram of a conventional CALL-and-RETURN invocation series of the computer of FIG. 1.

Application source program 110 may include a chain of subroutine terminal calls and returns such as is shown in FIG. 2. It should be understood that each subprogram 200 to 209 may include additional calls within its body. These are not considered to be a part of the chain and are not a subject of focus of this application. The application concerns only terminal calls of invoked subprograms, i.e., the last statement performed by an invoked subprogram prior to its returning to the invoking subprogram. As shown in FIG. 2, the chain begins with a call by main subprogram 200 to A subprogram 201. A subprogram 201 in turn calls B subprogram 202 and then immediately ends with a return. B subprogram 202 in turn calls C subprogram 203 and then immediately ends with a return, and so on. Finally, a called G subprogram 208 calls H subprogram 209 and then immediately ends with a return, while H subprogram 209 merely ends with a return. As shown in FIG. 2, H subprogram 209 returns to its calling G subprogram 208, which in turn immediately returns to its calling subprogram, and so on up the chain. Returned-to C subprogram 203 immediately returns to B subprogram 202, which immediately returns to A subprogram 201, which immediately returns to main subprogram 200.

The "end" of a subprogram referred to hereinabove is a logical end, in that it is the last statement executed during execution of the subprogram. There is no intent to imply that this "end" is a physical end, i.e., that this last-executed statement must be physically the last statement in a listing of the subprogram.

Figure 3:
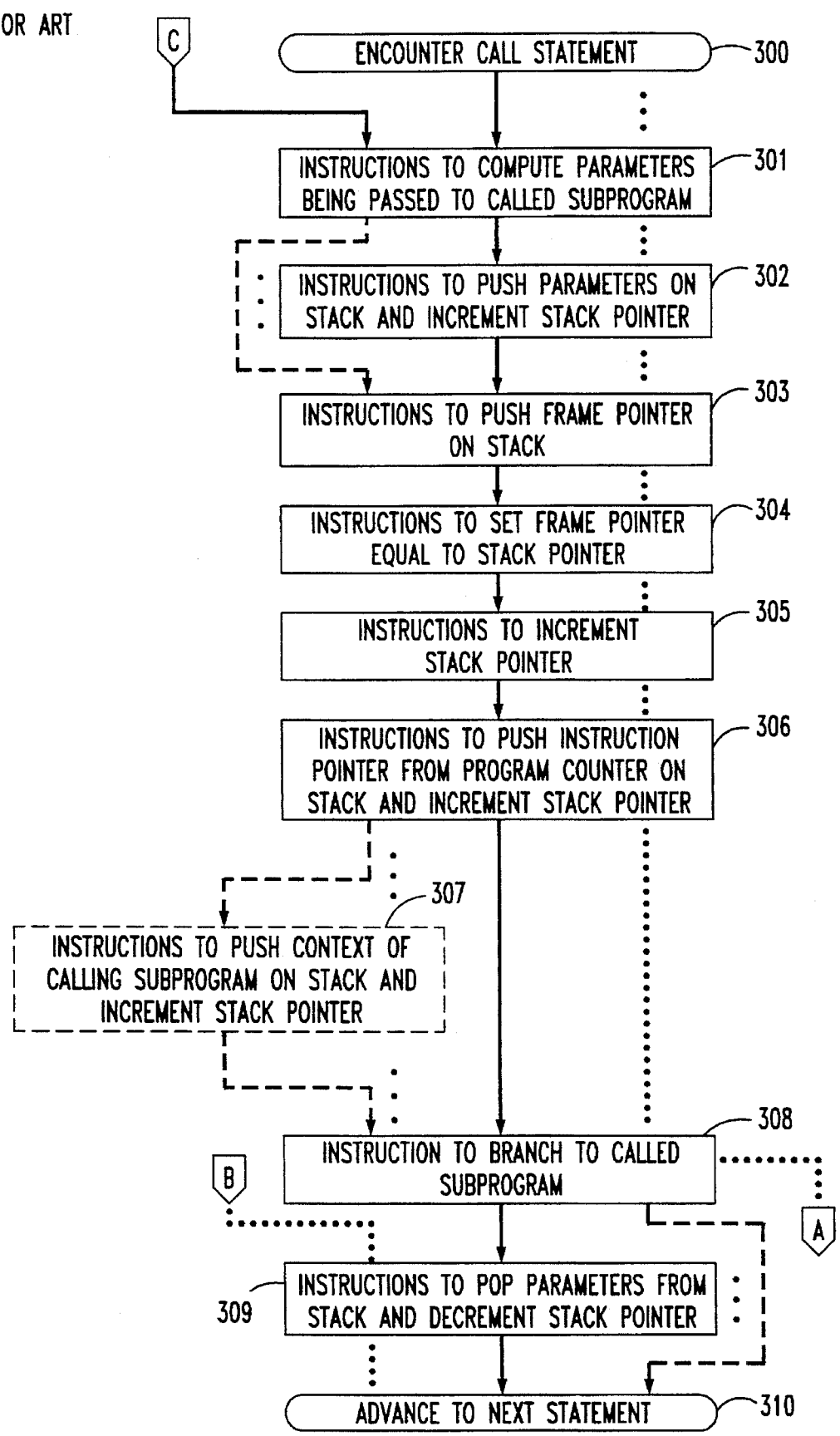
FIGS. 3–5 are flow diagrams of the operations of a conventional compiler in compiling a program that includes the statements of FIG. 2, and of the execution of the compiled instructions by the computer of FIG. 1.
Figure 4:
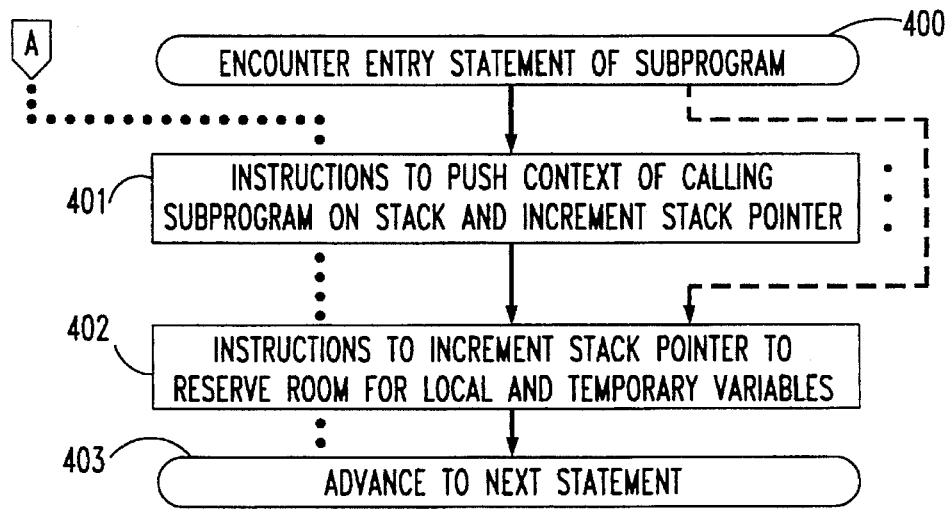
Figure 5:
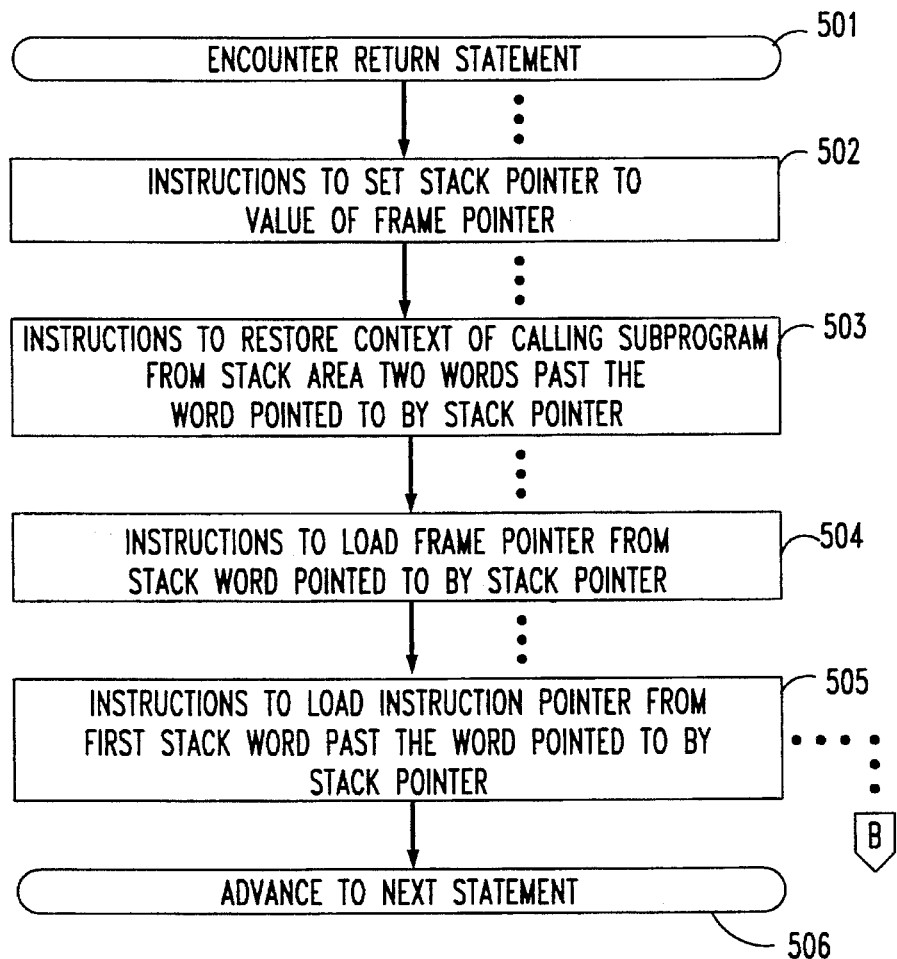

A conventional compiler 111 responds to encounters in application source program 110 of CALL and RETURN statements such as those of FIG. 2 in the manner shown in FIGS. 3–5. These figures show the logical functionality of a typical compiler -this functionality may not parallel precisely the functionality of any particular implementation of a compiler.

Turning to FIG. 3, upon encountering a CALL statement, at step 300, compiler 111 generates application object program 112 instructions to compute parameters that are being passed by the calling subprogram (e.g., main subprogram 200 in FIG. 2) to the called subprogram (e.g., A subprogram 201 in FIG. 2), at step 301. Compiler 111 then typically generates instructions to push the parameters onto stack 114 and into an area 701, and to increment stack pointer 602 accordingly, at step 302. However, in some processors, parameters are passed between subprograms through a set of global registers (not shown) and not through stack 114. In the case of such processors, compiler 111 omits step 302, as shown by dashed lines in FIG. 3. Furthermore, in practice, steps 301 and 302 can be interleaved on a per-parameter basis.

Next, compiler 111 generates instructions to push the value of frame pointer 601 onto stack 114 into an area 702, at step 303; to set frame pointer 601 equal to stack pointer 602, at step 304, thereby to move up frame pointer 601 to point to the start of the next frame; and to increment stack pointer 602, at step 305, to account for step 303. Compiler 111 then generates instructions to push instruction pointer 603, which points to the next object code instruction that is to be executed, onto stack 114 into an area 703 and to increment stack pointer 602 to account for this stack 114 entry, at step 306.

Some compilers 111 next generate instructions to push the context of the calling subprogram onto stack 114 into an area 704, and to increment stack pointer 602 to account for these entries, at step 307. The context is the information that computer 100 will need to resume execution of the calling subprogram, such as the contents of general purpose registers 604. However, most compilers, as a memory optimization, perform the equivalent of step 307 at a different location. Hence, step 307 is shown in dashed lines in FIG. 3.

Having completed generation of instructions to store information on stack 114, compiler 111 generates an instruction to branch to the called subprogram, at step 308.

Until this point, the order of generation by compiler 111 of the application object program instructions follows the order of their execution. The order of execution of the application object program when it becomes executing program 111 is shown by dotted lines in FIGS. 3–5. Due to the branch instruction generated at step 308, execution of the application object program continues with the called subprogram in FIG. 4, and returns to the calling subprogram only following completion of execution of the called subprogram and all subprograms that it may have invoked. Upon that return, the parameters that were passed by the calling subprogram to the called subprogram at step 302 are no longer needed, so compiler 111 next generates instructions to pop the parameters from stack 114 by decrementing stack pointer 602 accordingly, at step 309. As was mentioned in conjunction with step 302, some processors do not pass the parameters through stack 114, and step 302 is eliminated. In those cases where step 302 is absent, step 309 is likewise absent. Hence, step 309 is shown to be bypassed by dashed line in FIG. 3.

At this point, instruction generation engendered by the CALL statement is completed, and compiler 111 advances to process the next statement of application source program 110, at step 3 10. Object code execution, when the application object program becomes executing program 111, likewise continues with object code instructions that result from the next application source program statement.

Turning to FIG. 4, upon encountering the beginning, the entry statement, of a subprogram, e.g., the called subprogram, in application source program 110, at step 400, a typical compiler performs the equivalent of the above-described step 307, at step 401. However, if the compiler is of the type that performed step 307 in FIG. 3, then the compiler does not perform step 401 in FIG. 4. This is shown by the dashed line in FIG. 4 which bypasses step 401. Next, compiler 111 generates instructions to increment stack pointer 602 to reserve an area 700 on stack 114 for local and temporary variables of the called subprogram, at step 402. The preliminaries are thus completed, and compiler 111 proceeds to process the body of the called subprogram, at step 403.

It will be noted that execution of application object program 111 proceeds from the branch instruction of step 308 of FIG. 3 to the instructions created in FIG. 4.

Turning to FIG. 5, upon encountering a RETURN statement in a called subprogram, at step 501, compiler 111 generates instructions to set stack pointer 602 equal to the value of frame pointer 601, at step 502. This has the effect of popping from stack 114 the entire frame of the returned-from subprogram. Compiler 111 then generates instructions to restore computer 100 to the context from stack 114 of the subprogram that had called the returned-from subprogram, at step 503, in order to get ready for resumption of execution of the calling subprogram. In view of steps 303–307 of FIG. 3, it will be seen that the context of the calling subprogram is located on stack 114 two words past the start of the popped frame that is now pointed to by stack pointer 602. Next, compiler 111 generates instructions to load the stored frame pointer value from stack 114 into frame pointer register 60 1, at step 504. In view of step 303 of FIG. 3, it will be seen that the stored frame pointer value is in the word of the popped frame that is now pointed to by stack pointer 602. Step 504 returns frame pointer 601 from pointing to the stack frame of the called subprogram to pointing to the stack frame of the calling subprogram. Compiler 111 also generates instructions to load the stored instruction pointer value from stack 114 into instruction pointer register 603, at step 505. In view of steps 303–306 of FIG. 3, it will be seen that the stored instruction pointer value is in the word of the popped frame that is past the word now pointed to by stack pointer 602. At this point, instruction generation engendered by the RETURN statement is completed, and compiler 111 advances to process the next statement of application source program 110, at step 506.

As shown by dotted line in FIG. 5, application object code execution, when the object program becomes executing program 111, follows the order of instruction creation in FIG. 5 through step 505. In response to execution of the instruction of step 505, application object program execution branches to the instruction which is pointed to by instruction pointer 603, and thereby returns to the calling subprogram, to instructions generated at step 309 of FIG. 3.

Figure 9:
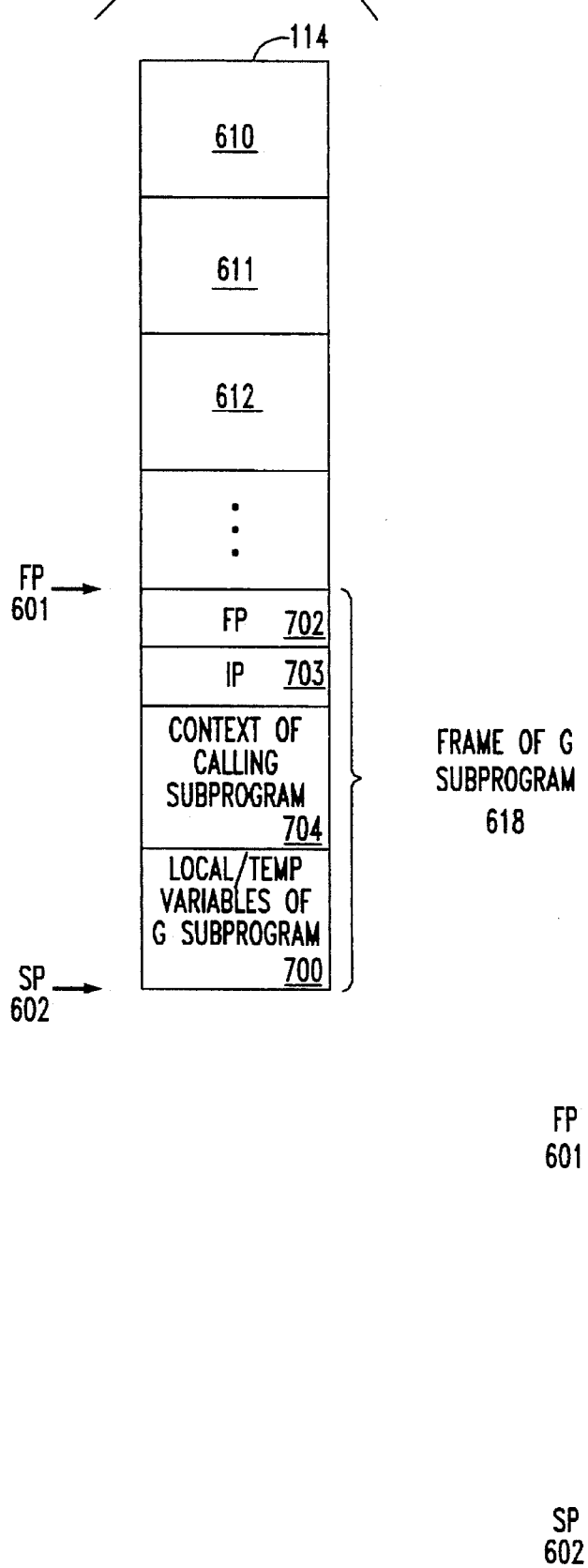
Figure 10:
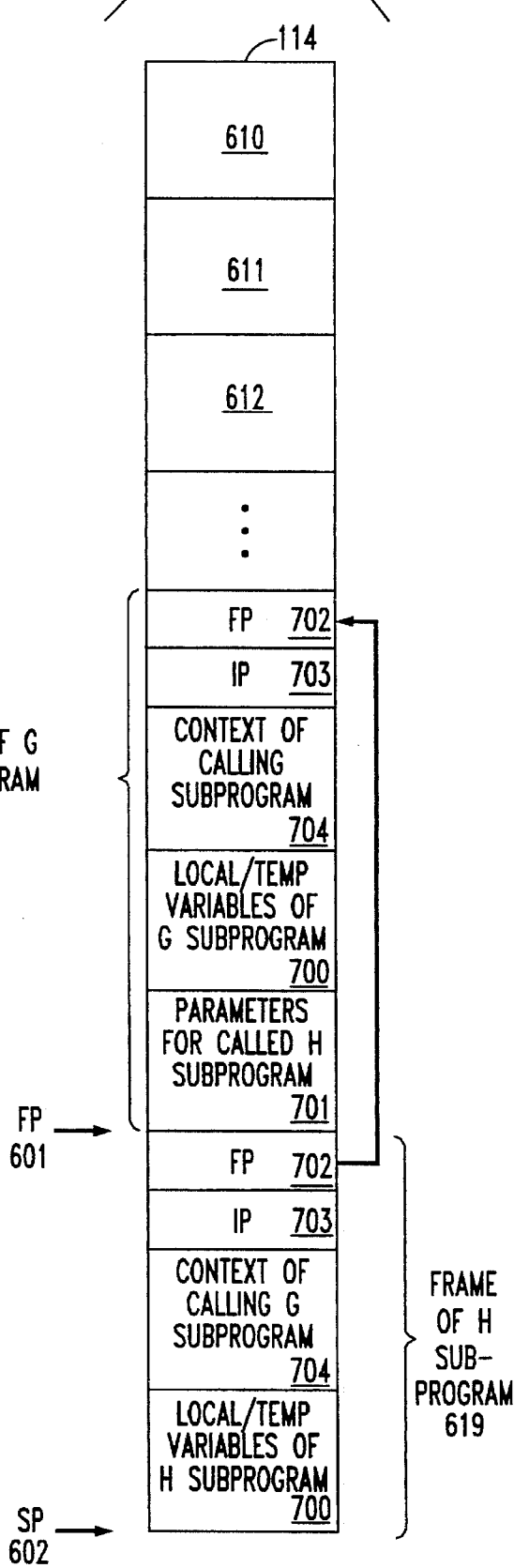

The net result of the responses of compiler 111 to the chain of CALL and RETURN statements shown in FIG. 2 is an application object program that, upon its becoming executing program 111, manipulates stack 114 in memory 101 in the manner shown in FIGS. 6–10. During execution of main subprogram 200 and prior to the call of A subprogram 201, stack 114 consists of a frame 610 of main subprogram 200 which contains an area 700 of local and temporary variables of main subprogram 200, as shown in FIG. 6. The call to A subprogram 201 expands frame 610 by adding thereto an area 701 of parameters for the called A subprogram 201, and also creates a new frame 611 for the called A subprogram 201. New frame 611 has an area 702 containing the frame pointer to the preceding frame 610, an area 703 containing the instruction pointer to the return point within instructions of the calling, main, subprogram 200, an area 704 containing the context of the calling, main, subprogram 200, and an area 700 for the local and temporary variables of the called A subprogram 201, as shown in FIG. 7. Similarly, the call to B subprogram 202 expands frame 611 of the calling A subprogram 201 and also creates a new frame 612 for the called B subprogram 201, as shown in FIG. 8. This process continues, so that at the point of call to G subprogram 208, stack 114 contains a frame for each preceding subprogram, and the call to G subprogram 208 adds a frame 618 for G subprogram 208 to stack 114, as shown in FIG. 9. Finally, the call to H subprogram 209 expands frame 618 and adds a frame 619 for H subprogram 209 to stack 114, as shown in FIG. 10.

The return from H subprogram 209 to G subprogram 208 deletes frame 619 of H subprogram 209 from stack 114, and restores stack 114 to the state shown in FIG. 9. A corresponding result is obtained for the return from each successive subprogram of the chain of FIG. 2, so that, finally, the return from C subprogram 203 to B subprogram 202 restores stack 114 to the state shown in FIG. 8, the return from B subprogram 202 to A subprogram 201 restores stack 114 to the state shown in FIG. 7, and the return from A subprogram 201 to main subprogram 200 restores stack 114 to the state shown in FIG. 6.

In contrast to the conventional operation just described, the operation of computer 100 according to the present invention is as shown in FIGS. 11–20 and described as follows.

Figure 11:
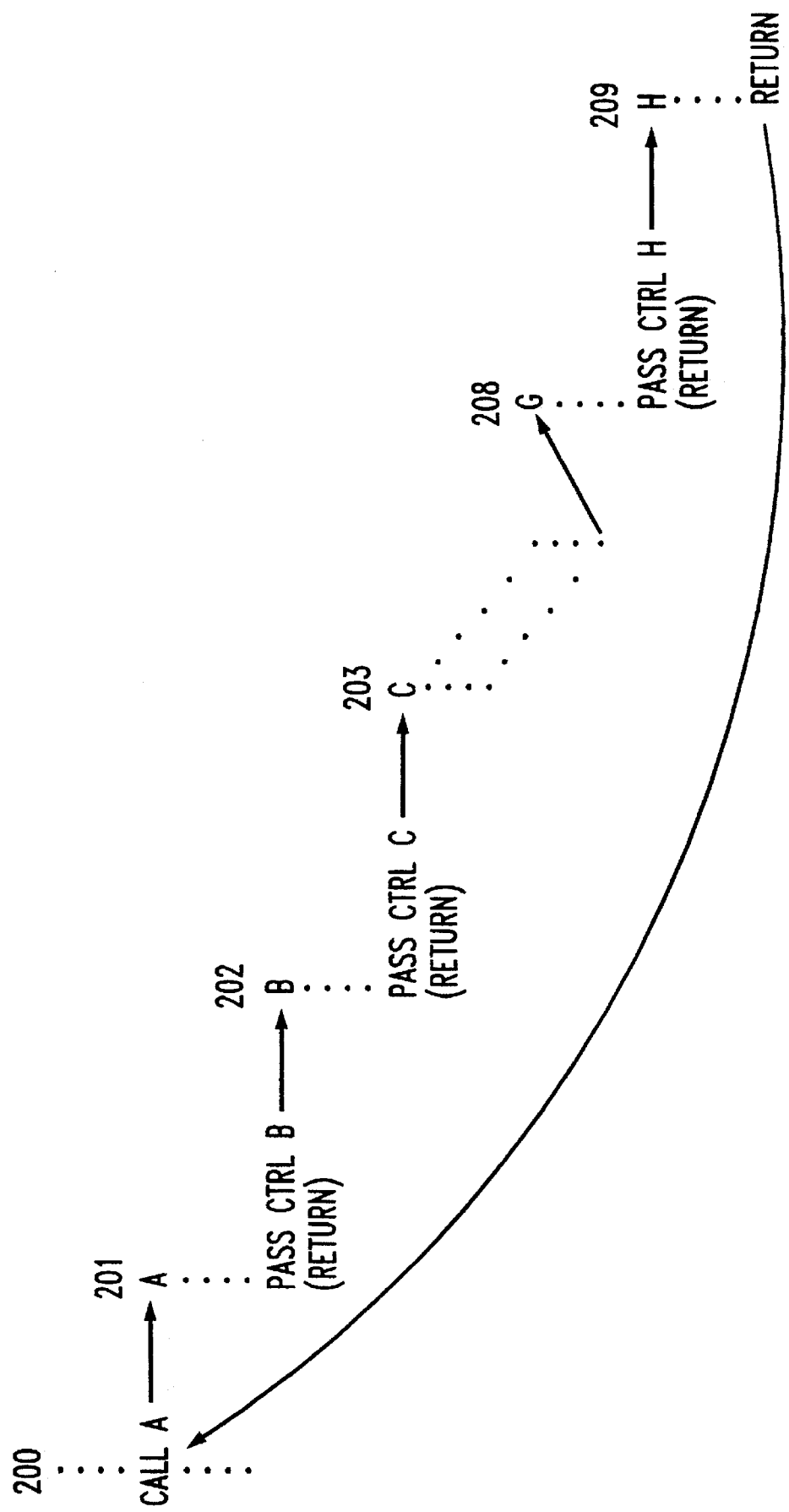
FIG. 11 is a functional diagram of a PASS CONTROL-and-RETURN invocation series of the computer of FIG. 1.

The chain of subroutine terminal CALL and RETURN statements of FIG. 2 is replaced in application source program 110 by a chain of PASS CONTROL statements such as is shown in FIG. 11. Main subprogram 200 still initiates the chain with a call to A subprogram 201. However, A subprogram 201 functionally ends by passing control to B subprogram 202, which functionally ends by passing control to C subprogram 203, and so on. Finally, G subprogram 208 functionally ends by passing control to H subprogram 209, which merely ends by returning. However, unlike the prior-art example of FIG. 2, the return from H subprogram 209 bypasses the whole chain of subprograms A 201 to G 208, and H subprogram 209 returns directly to main subprogram 200 which initiated the chain. When execution of H subprogram 209 ceases, execution of main subprogram 200 resumes immediately without a resumption of execution in the meantime of any of the other subprograms A 201 through G 208. Thus, the chaining back of step-by-step returns from called to calling subprograms is eliminated and collapsed into a single return, thereby saving the processing time that would otherwise be consumed by the individual step-by-step-returns.

It is stated above that each invoked subprogram A 201 to G 208 functionally ends by passing control to the next invoked function. This is so because a subprogram may so end either implicitly or explicitly. Explicitly, the last-executed statement of a subprogram may be a new statement PASS CONTROL, which serves both to pass control to the invoked subprogram and to delimit the end of the invoking subprogram.

Implicitly, subprograms A 201 to G 208 may each end with the new PASS CONTROL statement followed by the conventional RETURN statement. But because the return will occur from H subprogram 209 directly to main subprogram 200, ending of subprograms A 201 to G 208 with RETURN statements, while possible, is unnecessary and superfluous. If RETURN statements are included in subprograms A 201 to G 208 following the PASS CONTROL statements, application object code instructions that are compiled in response to the RETURN statements are bypassed and are never executed.

Further implicitly, the subprograms A 201 to G 208 may each end conventionally, with the conventional CALL and RETURN statements. In other words, the replacement in application source program 110 of the CALL-and-RETURN statement chain of FIG. 2 need not be done explicitly, such as by a programmer when writing application program 110, but may be done implicitly, by compiler 111 itself during compilation of application program 110. In that instance, compiler 111 is caused to examine the ending statements of subprograms to determine whether the CALL and RETURN statements are the last two statements of the subprograms to be executed, and if so, to convert them into object code instructions that are the equivalent of the PASS CONTROL statement.

The above-described functionality of effecting a single return directly from the end of a chain of invoked subprograms to the beginning of the chain is facilitated by, and implemented through, the sharing of a stack frame by invoked subprograms A 201 through H 209. In other words, new stack frames for each invoked subprogram are not created; rather, only one stack frame is created for, and used sequentially by, all of the invoked subprograms.

Figure 12:
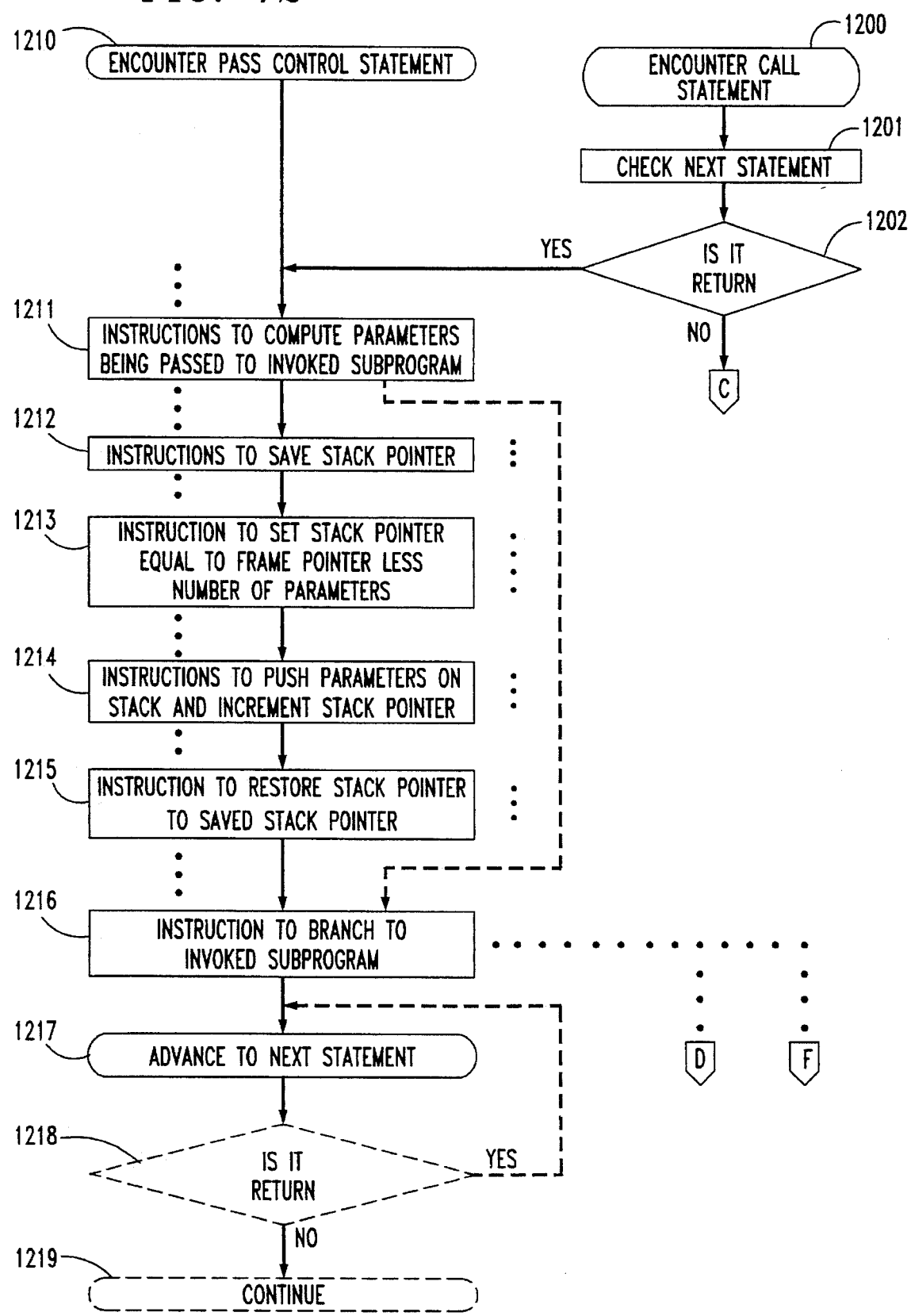
FIGS. 12–14 are flow diagrams of the operations of a compiler in compiling a program that includes the statements of FIG. 11, and of the execution of the compiled instructions by the computer of FIG. 1.
Figure 13:
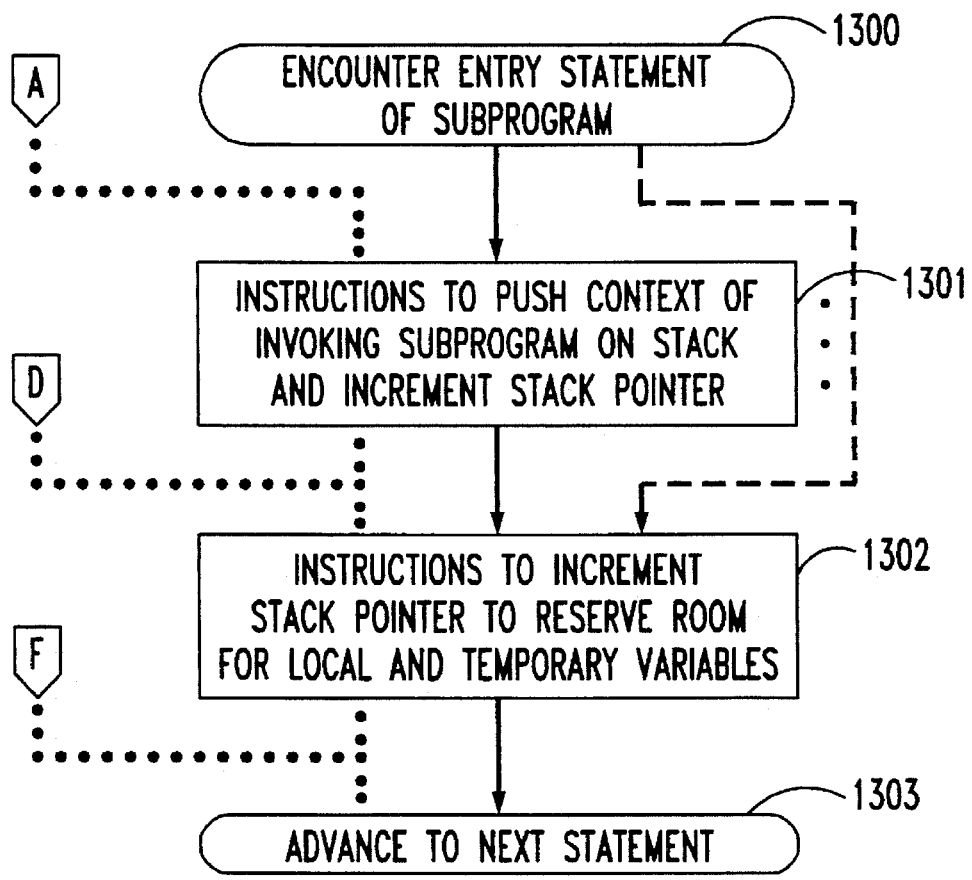
Figure 14:
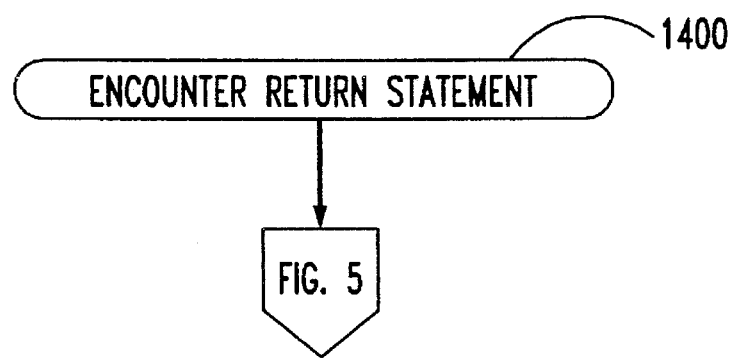

A compiler 111 according to this invention responds to explicit or implicit encounters in source program 110 of PASS CONTROL and RETURN statements in the manner shown in FIGS. 12–14. Compiler 111 responds to those conventional CALL and RETURN statements that are not implicit PASS CONTROL statements in the conventional manner discussed above. As in the case of FIGS. 3–5, FIGS. 12–14 show the logical functionality of the compiler.

Turning to FIG. 12, upon encountering a CALL statement, at step 1200, compiler 111 checks whether it is an implicit PASS CONTROL statement, by checking the next statement of application source program 110, at step 1201, to determine if that next statement is a RETURN statement, at step 1202. If that next statement is not a RETURN statement, the CALL statement is not an implicit PASS CONTROL statement, and compiler 111 processes the CALL statement conventionally, in the manner shown in FIG. 3. But if the statement that follows the CALL statement is a RETURN statement, the CALL statement is an implicit PASS CONTROL statement, and compiler 111 proceeds to step 1211.

Alternatively, upon encountering an explicit PASS CONTROL statement, at step 1210, compiler 111 proceeds directly to step 1211.

At step 1211, compiler 111 generates application object program 112 instructions to compute parameters that are being passed by the invoking subprogram to the invoked subprogram -the equivalent of step 301 of FIG. 3. Compiler 111 then typically generates instructions to push the parameters onto stack 114.

A subprogram expects to find parameters in the frame that precedes its own frame on the stack. But in this instance, a new stack frame will not be created for the invoked subprogram. Consequently, the parameters must be stored in the parameters area of the preceding frame, frame 610 of main subprogram 200. In order to do so, compiler 111 performs the following functions.

Compiler 111 creates instructions to temporarily save the present value of stack pointer 602, at step 1212, and to set stack pointer 602 equal to frame pointer 601 less the number of parameters that are being passed to the invoked subroutine, at step 1213. This has the effect of pointing the stack pointer into parameters area 701 of stack frame 610 of main subroutine 200. In order to ensure that stack pointer 602 does not point any place outside of, i.e., before, parameters area 701, a limit on the maximum allowable number of parameters must be imposed, and instructions priorly generated at step 302 of FIG. 3 must increment stack pointer 602 by that maximum allowable number to ensure that space for the allowed number of parameters will be available on the stack at step 1213 of FIG. 12. This can be done by calling A subprogram 201 with enough dummy parameters so that the total number of parameters equals the maximum, or by supporting a "pragmat" statement that allows one to declare the size to be reserved for a parameters area.

Having pointed stack pointer 602 into parameters area 701 of preceding stack frame 610, compiler 111 generates instructions to push the computed parameters onto stack 114 and to increment stack pointer 602 accordingly, at step 1214 that is a duplicate of step 302 of FIG. 3. Compiler 111 now generates an instruction to restore stack pointer 602 to the value that was saved at step 1212, thereby causing stack pointer 602 to again point to the "top" of stack 114, at step 1215.

It was stated above that compiler 111 typically generates instructions to push parameters onto the stack. However, as was explained in conjunction with FIG. 3, parameters in some processors are passed not through stack 114 but through global registers. In that case, compiler 111 omits steps 1212–1215, as shown by dashed lines in FIG. 12.

Next, compiler 111 generates an instruction to branch to the invoked subprogram, at step 1216. As will be made clear below, an invoked subprogram now has a number of entry points. Instead of generating an instruction to branch to the beginning of the invoked subprogram, as would be the case in step 308 of FIG. 3, compiler 111 now generates an instruction to branch to a point in the invoked subprogram that is offset by one or another (depending upon implementation option) predetermined amount from the beginning of the invoked subprogram.

At this point, instruction generation engendered by the PASS CONTROL statement is completed, and compiler 111 advances to process the next statement of application source program 110, at step 1217. That processing may be conventional.

Alternatively, as shown by dashed lines and boxes in FIG. 12, compiler 111 may check the next statement in the application source program, to determine if it is a RETURN statement, at step 1218. As was explained above, a RETURN statement which follows an explicit or an implicit PASS CONTROL statement is superfluous, so compiler 111 optionally ignores it and returns to step 1217 to advance to, and process, the next application source code statement that follows the RETURN statement. But if the statement that follows the implicit or explicit PASS CONTROL statement is not found at step 1218 to be a RETURN statement, compiler 111 continues with conventional compiling, at step 1219. Criteria for reachability of statements that follows a PASS CONTROL statement are the same as for a RETURN statement.

Down through step 1216, the order of generation by compiler 111 of the application object program instructions 112 follows the order of their execution. The order of execution of the application object program, when it becomes executing program 111, is shown by dotted lines in FIGS. 12–14. Due to the branch instruction generated at step 1216, execution of the application object program continues with the called subprogram in FIG. 13.

Turning to FIG. 13, it is a functional equivalent of FIG. 4, with the exception that the resulting application object program has a plurality of entry points. Thus, upon encountering the beginning, entry, statement of a subprogram, e.g., the invoked subprogram, in application source program 110, at step 1300, compiler 111 executes the equivalent of the functions of FIG. 4, as described for FIG. 4.

Execution of the application object subprogram created by compiler 111 in FIG. 13 proceeds as described for FIG. 4. That is, upon branching to this subprogram conventionally as a consequence of a conventional CALL statement, object subprogram execution commences with the code created at step 1301, providing that step 307 has not been performed in FIG. 3, and otherwise commences with the code created at step 1302, in direct correspondence to what was described for FIG. 4. Upon branching to execution of the object subprogram of FIG. 13 as a consequence of an implicit or an explicit PASS CONTROL statement, there is no need to save the context of the invoking subprogram. Consequently, execution of the object subprogram begins at a point subsequent to the instructions, if any, that were created at step 1301.

Furthermore, two options relating to stack frame sharing are offered in this illustrative example. The first option is that invoked subprograms share all areas 700–704 of shared stack frame 1620. The second option is that each invoked subprogram has its own local and temporary variables area 700 within shared stack frame 1620. Under the first option, compiler 111 generates, at step 1216 of FIG. 12, an instruction to branch to a point in the application object subprogram that is a fixed offset from the beginning of the object subprogram and begins with instructions generated at step 1303, thereby effectively bypassing all instructions generated in FIG. 13. Under the second option, compiler 111 generates, again at step 1216 of FIG. 12, an instruction to branch to a fixed offset point in the application object subprogram that begins with instructions generated at step 1302 of FIG. 13. These offset points are fixed, i.e., the same, for any subprogram processed by that compiler.

Turning to FIG. 14, upon encountering a RETURN statement in an invoked subprogram which statement is not optionally disposed of in the manner shown in steps 1218–1217 of FIG. 12, at step 1400, compiler responds in the conventional manner, by performing the functions shown in FIG. 5.

During application object code execution, when the application object program becomes executing program 111, code generated by the compiler in response to the RETURN statement of H subprogram 209 is the first and only RETURN code encountered in the application object code that was generated as a consequence of compiling subprograms A 201 through H 209 of FIG. 11. Execution of the code generated by the compiler at step 502 of FIG. 5 for H subprogram 209 pops from stack 114 all information subsequent to frame 610 of main subprogram 200. Execution of the code generated by the compiler at steps 503–505 restores computer 100 to the state it was in when main subprogram 200 invoked A subroutine 201. Hence, in response to execution of the branch effected at step 505, execution returns to main subprogram 200, to instructions generated at step 309 of FIG. 3. In the process, any object code that may have been generated for RETURN statements of subprograms A 201 through G 208 is skipped and is never executed.

Figure 15:
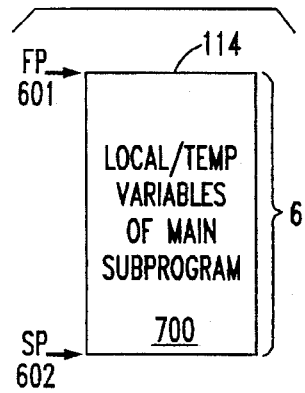
FIGS. 15–20 are block diagrams of execution stack manipulations effected by the execution of the compiled instructions of FIGS. 12–14 by the computer of FIG. 1.
Figure 16:
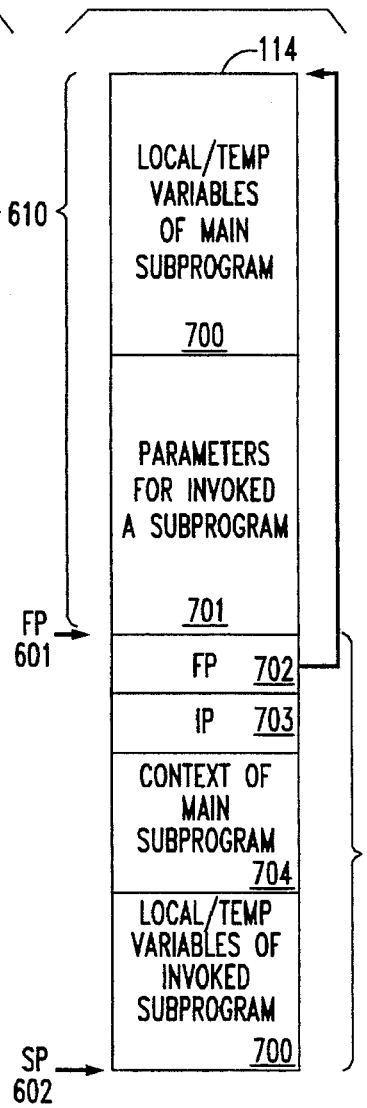

The net result of the responses of compiler 111 to the implicit or explicit chain of PASS CONTROL statements shown in FIG. 11 is an application object program 112 that, upon its becoming the executing program 111, manipulates stack 114 in memory 101 in the manner shown in FIGS. 15–20. As shown in FIGS. 15 and 16, before and after the call by main subprogram 200 to A subprogram 201, stack 114 is the same as was described for the prior art and shown in FIGS. 6 and 7, respectively. However, in FIG. 16, stack frame of A subprogram 201 has been relabeled "shared frame 1620" to indicate its upcoming new function.

Figure 17:
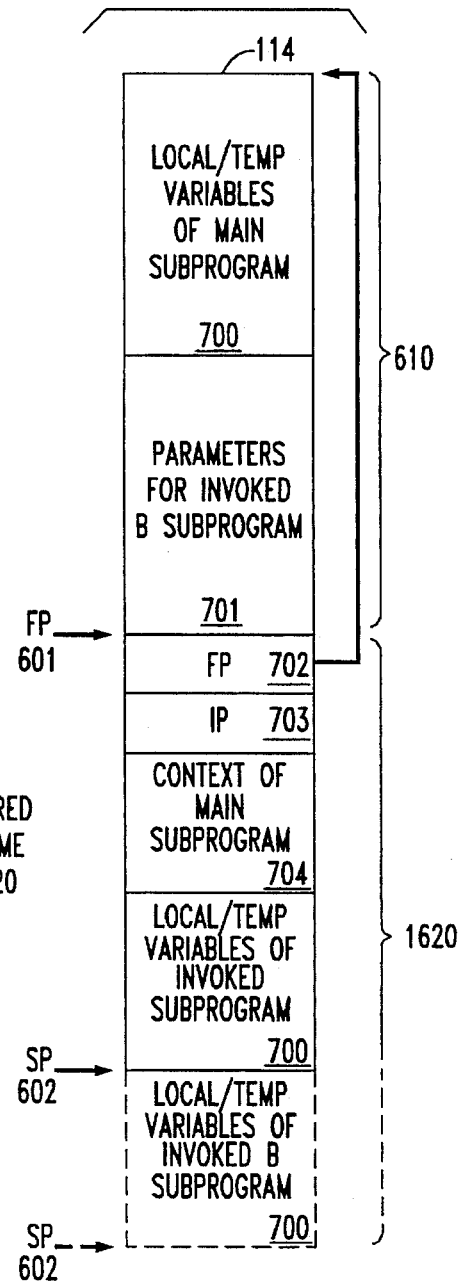

As shown in FIG. 17, after A subprogram 201 passes control to B subprogram 202, parameters area 701 of frame 610 of main subprogram 200 no longer stores parameters for called A subprogram 201, but now stores parameters for invoked B subprogram 202. In accordance with option one described in conjunction with step 1302 of FIG. 13, local /temp variables area 700 of shared frame 1620 also no longer stores variables of called A subprogram 201, but now stores variables of invoked B subprogram 202. In accordance with option two, however, the original local/temp variables area 700 of shared frame 1620 continues to store variables for called A subprogram 201, and shared frame 1620 has expanded by an additional local/temp variables area 700 for storing variables of invoked B subprogram 202.

Figure 18:
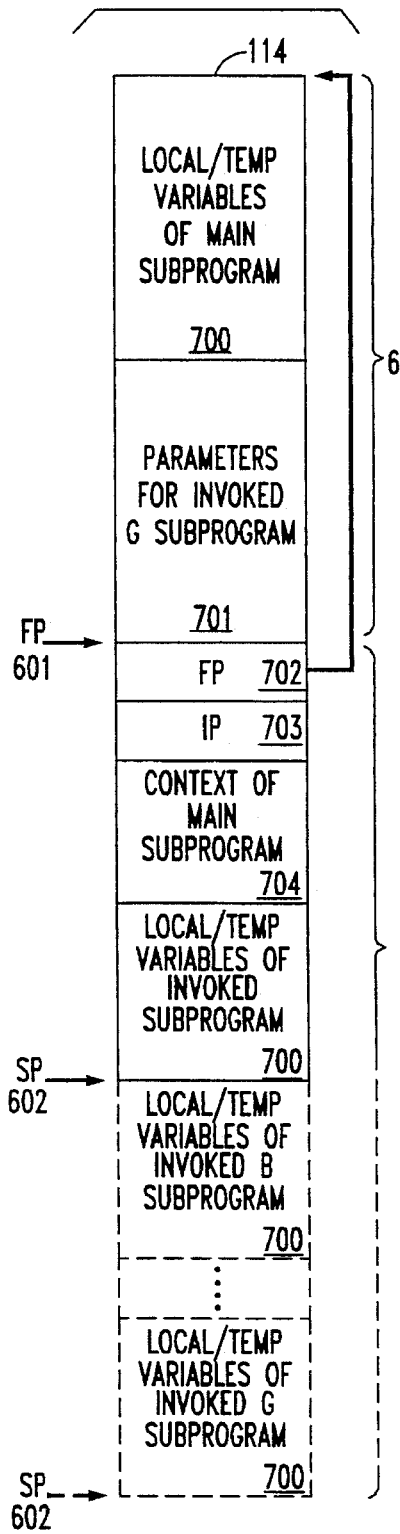

Corresponding changes to stack 114 occur for every encountered PASS CONTROL statement. Thus, after invocation of G subprogram 208, as shown in FIG. 18, parameters area 701 of frame 610 stores parameters of G subprogram 208, and either the single local/temp variables area 700 of shared frame 1620 now stores variables of G subprogram 208, or shared frame 1620 has grown to include a plurality of areas 700 one for each subprogram A 201 through G 208.

Figure 19:
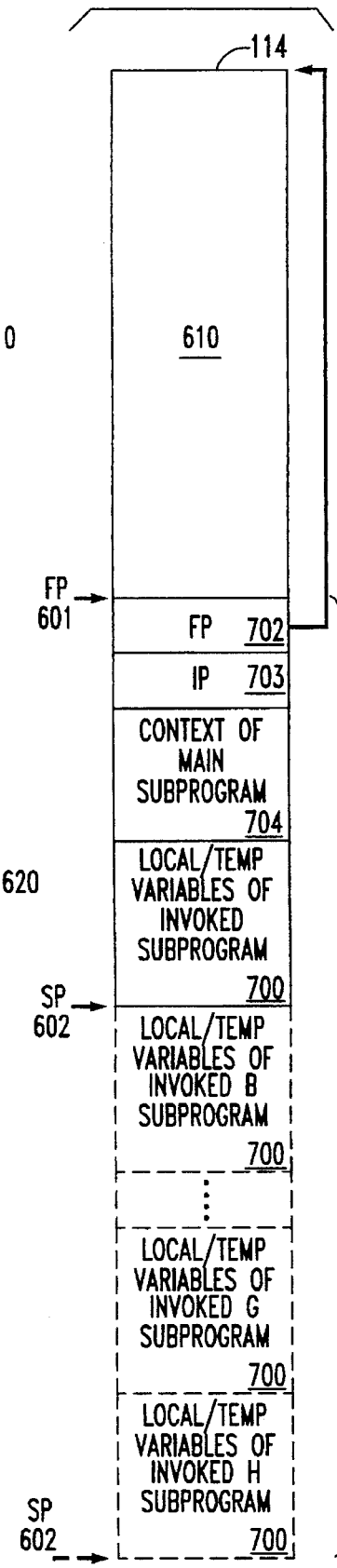

As shown in FIG. 19, after invocation of H subprogram 209, parameters area 701 of frame 610 stores parameters of H subprogram 209, and either the single local/temp variables area 700 of shared frame 1620 now stores variables of H subprogram 209, or shared frame 1620 has grown to include a plurality of areas 700 one for each subprogram A 201 through H 209.

Figure 20:
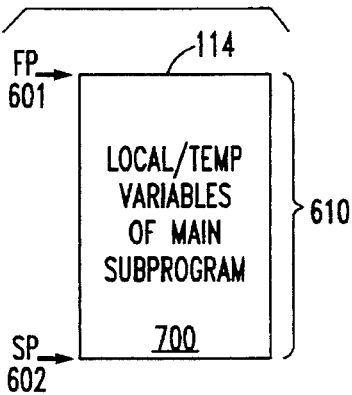

As shown in FIG. 20, following return from H subprogram 209, stack 114 is directly, immediately, restored to its condition shown in FIG. 15 that preceded the call of A subprogram 201.

Of course, it should be understood that various changes and modifications may be made to the above-described illustrative embodiment of the invention. For example, it is irrelevant where the parameters area is located on the stack, as long as it is sized adequately to permit its recycling, or sharing. The same holds true for the local and temporary variables area. Such changes and modifications may be made without departing from the spirit and the scope of the invention. It is therefore intended that such changes and modifications be covered by the following claims.

I claim:

1. An arrangement for compiling a source program comprising a plurality of different source subprograms made up of source code statements including subprogram invocation statements and subprogram return statements into an object program comprising a plurality of object subprograms made up of object instructions, comprising:

first means responsive to encountering in a source subprogram a statement CALLing a source subprogram, which statement is a first invocation statement in a series of statements of invocation of a plurality of different subprograms, the statements in the series except for the first invocation statement each being included in a source subprogram that is invoked by a preceding invocation statement in the series, the series commencing with the first invocation statement followed by at least one intermediate invocation statement and thereafter ending with a last invocation statement, for generating (a) an instruction to create on an execution stack a stack frame for the object subprogram compiled from the invoked source subprogram (b) an instruction to reserve in the stack frame a parameters area for passing parameters between object subprograms compiled from invoking source subprograms in the series and object subprograms compiled from invoked sources subprograms in the series, (c) art instruction to store parameters, that are being passed by the object subprogram compiled from the invoking source subprogram to the object subprogram compiled from the invoked subprogram, in the reserved parameters area, (d) an instruction to store in the stack frame a pointer to an instruction at which is to resume the execution of an object subprogram compiled from the source subprogram that includes the first invocation statement, and (e) an instruction to branch from execution of the object program compiled from the source subprogram that includes the invoking statement, to execution of an object subprogram compiled from the invoked source program;

second means responsive to encountering in a source subprogram each subsequent invocation statement in the series, each said subsequent statement PASSing CONTROL to a source subprogram, for (a) refraining from generating an instruction to create another stack frame on the execution stack, (b) generating an instruction to store parameters, that are being passed by the object subprogram compiled from the invoking source subprogram to the object subprogram compiled from the invoked source subprogram, in the reserved parameters area, (c) generating an instruction to branch from execution of an object program compiled from the source subprogram that includes the invoking statement, to execution of an object subprogram compiled from the invoked source subprogram, and (d) refraining from generating any instruction to store a pointer to an instruction at which execution is to resume; and third means responsive to encountering a RETURN statement in a source subprogram that is invoked by the last invocation statement in the series, for generating (a) an instruction to retrieve the instruction pointer from the execution stack and to branch from execution of an object subprogram compiled from the source subprogram that includes the RETURN statement directly to execution of the object subprogram compiled from the subprogram that includes the first invocation statement in the series at the instruction pointed to by the instruction pointer retrieved from the execution stack, without in a meantime resuming execution of any object program compiled from a source subprogram that includes an intermediate invocation statement in the series, and (b) an instruction to delete from the execution stack the stack frame that was created in response to encountering the first invocation statement.

2. A compiler arrangement comprising:

means for compiling a source program comprising a plurality of different source subprograms made up of source code statements including subprogram invocation statements and subprogram return statements into an object program comprising a plurality of object subprograms made up of object code instructions, the means including first means responsive to encountering in a source subprogram each statement invoking a source subprogram, for generating an instruction to branch from execution of an object subprogram compiled from the source subprogram that includes the invoking statement, to execution of an object subprogram compiled from the invoked source subprogram, second means responsive to encountering in a source subprogram a statement invoking a source subprogram, which statement is a first invocation statement in a series of statements of invocation of a plurality of different source subprograms, the statements in the series except for the first invocation statement each being included in a source subprogram that is invoked by a preceding invocation statement in the series, the series commencing with the first invocation statement followed by at least one intermediate invocation statement and thereafter ending with a last invocation statement, for generating instructions to create on an execution stack a stack frame for the invoked subprogram and to store in the stack frame a pointer to an instruction at which is to resume the execution of an object subprogram compiled from the source subprogram that includes the first invocation statement, the means for compiling refraining from generating instructions to create a stack frame on the execution stack in response to encountering each invocation statement in the series subsequent to the first invocation statement, third means responsive to encountering each said invocation statement in the series, for generating an instruction to store parameters, that are being passed by the object subprogram compiled from the invoking source subprogram to the object subprogram compiled from the invoked source subprogram, in the stack frame that was created in response to encountering the first invocation statement, and fourth means responsive to encountering a return statement in a source subprogram that is invoked by the last invocation statement in the series, for generating an instruction to retrieve the instruction pointer from the execution stack and to branch from execution of an object subprogram compiled from the source subprogram that includes the return statement directly to execution of the object subprogram compiled from the source subprogram that includes the first invocation statement in the series at the instruction pointed to by the instruction pointer retrieved from the execution stack, without in a meantime resuming execution of any object subprogram compiled from a source subprogram that includes an intermediate invocation statement in the series, and further for generating an instruction to delete from the execution stack the stack frame that was created in response to encountering the first invocation statement.

3. The arrangement of claim 2 wherein the means for compiling a source program refrain from generating instructions to store on the execution stack a pointer to an instruction at which execution is to resume, in response to encountering in the source program each invocation statement in the series subsequent to the first invocation statement.

4. The arrangement of claim 2 wherein the third means further respond to encountering the first invocation statement in the series by generating an instruction to store on the execution stack an execution context of the object subprogram compiled from the source subprogram that includes the first invocation statement; wherein the means for compiling refrain from generating instructions to store a context on the execution stack, in response to encountering each invocation statement in the series subsequent to the first invocation statement; and wherein the fourth means further respond to encountering the return statement by generating an instruction to restore execution context from the execution stack to the execution context of the object subprogram compiled from the source subprogram that includes the first invocation statement, without generating instructions to restore in a meantime the execution context to an execution context of any object subprogram compiled from the source subprogram that includes an intermediate invocation statement in the series.

5. The arrangement of claim 2 wherein:

the second means include means responsive to encountering the first invocation statement, for generating an instruction to reserve on the stack frame that was created in response to encountering the first invocation statement, a parameters area for passing parameters to or from every object subprogram compiled from a source subprogram invoked by an invocation statement in the series; and the third means include means responsive to encountering each said invocation statement in the series, for generating an instruction to store parameters for the object subprogram compiled from the invoked source subprogram in the reserved parameters area.

6. The arrangement of claim 2 wherein:

the third means include fifth means responsive to encountering each invocation statement in the series, for generating instructions to store information in addition to the parameters for the object subprogram compiled from the invoked source subprogram in the stack frame that was created in response to encountering the first invocation statement.

7. The arrangement of claim 6 wherein:

the information includes local variables.

8. The arrangement of claim 6 wherein:

the second means include means responsive to encountering the first invocation statement, for generating an instruction to reserve on the stack frame that was created in response to encountering the first invocation statement, an area for the information of the object subprograms compiled from the invoked source subprograms in the series; and the fifth means respond to encountering each invocation statement in the series by generating an instruction to store the information of the object subprogram compiled from the invoke source subprogram in the reserved area for the information.

9. The arrangement of claim 6 wherein the means for compiling a source program refrain from generating an instruction to store on the execution stack a pointer to an instruction at which execution is to resume, in response to encountering each invocation statement in the series subsequent to the first invocation statement.

10. The arrangement of claim 6 wherein the second means further include means responsive to encountering the first invocation statement, for generating an instruction to store in the stack frame an execution context of the object subprogram compiled from the source subprogram that includes the first invocation; wherein the means for compiling a source program refrain from generating an instruction to store a context on the execution stack, in response to encountering each invocation statement in the series subsequent to the first invocation statement; and wherein the fourth means include means responsive to encountering the return statement, for generating an instruction to restore execution context from the stack frame to the execution context of the object subprogram compiled from the source subprogram that includes the first invocation statement.

11. The arrangement of claim 6 wherein the fifth means include means responsive to encountering each invocation statement, for generating an instruction to reserve in the stack frame an area for the information of the object subprogram compiled from the invoked source subprogram, and means for generating an instruction to store the information of the object subprogram compiled from the invoked subprogram in the area for the information that is reserved for the object subprogram compiled from the invoked source subprogram.

12. The arrangement of claim 2 wherein the means for compiling comprise a general-purpose data processor operating under control of a stored program containing a set of instructions for enabling the data processor to compile the source program into the object program.

* * * * *